US 7,953,065 B2

(12) United States Patent
Lysejko et al.

(10) Patent No.: US 7,953,065 B2
(45) Date of Patent: May 31, 2011

(54) POINT TO MULTIPOINT DEVICE FOR COMMUNICATION WITH A PLURALITY OF TELECOMMUNICATIONS UNITS

(75) Inventors: Martin Lysejko, Bagshot (GB); Andrew Logothetis, Beaconsfield (GB)

(73) Assignee: Airspan Networks Inc., Boca Raton, FL (US)

( * ) Notice: Subject to any disclaimer, the term of this patent is extended or adjusted under 35 U.S.C. 154(b) by 1219 days.

(21) Appl. No.: 11/564,232

(22) Filed: Nov. 28, 2006

(65) Prior Publication Data
US 2008/0198793 A1   Aug. 21, 2008

(30) Foreign Application Priority Data

Dec. 9, 2005 (GB) .................................. 0525161.6
Jun. 7, 2006 (GB) .................................. 0611227.0

(51) Int. Cl.
*H04J 3/06* (2006.01)
(52) U.S. Cl. ............... 370/350; 370/311; 455/562.1; 455/129; 455/561; 375/295; 375/315; 375/311
(58) Field of Classification Search ............ 370/350, 370/311; 455/562.1, 129, 561; 375/295–315
See application file for complete search history.

(56) References Cited

U.S. PATENT DOCUMENTS

| | | | | |
|---|---|---|---|---|
| 6,054,949 A | * | 4/2000 | Grassmann | 342/383 |
| 6,141,335 A | * | 10/2000 | Kuwahara et al. | 370/342 |
| 6,404,821 B1 | * | 6/2002 | Dent | 375/267 |
| 6,438,389 B1 | | 8/2002 | Sandhu et al. | |
| 6,470,195 B1 | | 10/2002 | Meyer | |
| 6,549,780 B2 | * | 4/2003 | Schiff et al. | 455/439 |
| 6,804,521 B2 | | 10/2004 | Tong et al. | |
| 2002/0177468 A1 | * | 11/2002 | Takeuchi et al. | 455/562 |
| 2003/0114196 A1 | * | 6/2003 | Chitrapu | 455/562 |
| 2004/0235527 A1 | | 11/2004 | Reudink et al. | |

(Continued)

FOREIGN PATENT DOCUMENTS

GB   2341048 A   3/2000

OTHER PUBLICATIONS

Oh, et al., "An orthogonal multi-beam based MIMO scheme for multi-user wireless systems," Vehicular Technology and IEEE Conferences, 2005, XP010855543, pp. 919-923.

(Continued)

*Primary Examiner* — Kamran Afshar
*Assistant Examiner* — Lameka J Kirk
(74) *Attorney, Agent, or Firm* — Haynes Beffel & Wolfeld LLP

(57) ABSTRACT

A point to multipoint device for use in a wireless network to provide wireless communication with a plurality of telecommunications units is described, for communication from the point to multipoint device to the telecommunications units, the point to multipoint device being operable to employ multiple sets of beams, at any point in time one set being used. The point to multipoint device comprises beam set generation logic for generating the multiple sets of beams arranged into one or more groups, each group comprising one beam from each set. Within each group the beams of that group are orthogonal with respect to each other, and each beam within each set is generated randomly with respect to other beams in that set. An interface is provided for receiving a synchronization signal issued to all point to multipoint devices in the wireless network.

17 Claims, 13 Drawing Sheets

U.S. PATENT DOCUMENTS

2005/0064872 A1  3/2005  Osseiran et al.
2005/0181833 A1  8/2005  Lee et al.

OTHER PUBLICATIONS

International Search Report for PCT/GB2006/004446, mailed Mar. 5, 2007.

Search report in GB0611227.0 dated Sep. 20, 2006.

"Chapter 3: Introduction to Smart Antennas: Spatial Processing for Wireless Systems," Smart Antennas, Adaptive Arrays, Algorithms, and Wireless Position Location, ed. TS Rappaport, Sep. 1998, pp. 81-116, IEEE Press, NJ.

* cited by examiner

|  | f=0 | f=1 | f=2 | f=3 | f=4 | f=5 | f=6 | f=7 | f=8 | f=9 | f=10 | f=11 |
|---|---|---|---|---|---|---|---|---|---|---|---|---|
| BS1 | a | b | c | a | b | c | a | b | c | a | b | c |
| BS2 | A | B | C | A | B | C | A | B | C | A | B | C |
| CCI | L1 | L2 | L3 | L1 | L2 | L3 | L1 | L2 | L3 | L1 | L2 | L3 |

Fig. 6

POINT TO MULTIPOINT DEVICE FOR COMMUNICATION WITH A PLURALITY OF TELECOMMUNICATIONS UNITS

BACKGROUND OF THE INVENTION

1. Field of the Invention

The present invention relates to a point to multipoint device for use in a wireless network to provide wireless communication with a plurality of telecommunication units, to a method of operating such a device, and to a wireless network comprising a plurality of such point to multipoint devices.

2. Description of the Prior Art

Point to multipoint devices within a wireless network may take a variety of forms. For example, such a point to multipoint device may take the form of a relay node or repeater used to propagate data within the wireless network. Such relay nodes or repeaters typically amplify and forward or decode and forward received signals within the wireless network. Another example of a point to multipoint device would be a base station associated with a cell of the wireless network for communicating over wireless links with a number of subscriber stations and/or relay nodes in the cell.

A wireless network infrastructure typically subdivides a geographic area into mutually disjoint regions called cells. Associated with each cell are one or more base stations (BSs) that communicate via radio signals with a number of subscriber stations (SSs) located within the same cell. The transmission path from the BS to the SS is known as the forward link or downlink communication path, whilst the transmission path from the SS to the BS is known as the reverse link or uplink communication path.

In one implementation, the BS may be connected to a telephone network and exists to relay messages from SSs in the cell controlled by the BS to the telephone network, and vice versa. By this approach, an item of telecommunications equipment connected to an SS may make an outgoing call to the telephone network, and may receive incoming calls from the telephone network.

However, such a wireless telecommunications system is not restricted to use with telephone signals, but could instead, or additionally, handle any other appropriate type of telecommunications signal, such as video signals, or data signals such as those used for transmitting data over the Internet and in order to support recent technology such as Broadband and video-on-demand technologies.

Within such a wireless network, a measure of the received signal quality is the Signal to Interference and Noise Ratio (SINR). For a given SINR, the receiver (for example the receiver provided at an SS) can request a suitable Modulation and Coding Scheme (MCS) that will maximise the data rate and at the same time ensure an acceptable Quality of Service (QoS). The Frame Error Rate (FER), i.e. the percentage of blocks of data that are received in error, is frequently used as a measure of the QoS. If a block of data is incorrectly decoded, then the receiver will inform the transmitter (for example the transmitter at the BS when considering the receiver at the SS) to resend the data. Whilst such a scheme is necessary to maintain an acceptable QoS, data repetition has the drawback of reducing the overall system throughput.

Cell sectorisation is a well-known technique for increasing the system capacity, system capacity being a measure of the ability of a network to serve and sustain simultaneous users. In cell sectorised layouts, the area within a cell is, under ideal situations, sub-divided into a number of non-overlapping regions called sectors. The sectors within the same cell are served by the same BS, or by different BSs (one per sector). In such sectorised layouts, the point to multipoint device may be considered to be the entire base station, or the sector specific logic, whether that be provided as a physically separate base station or as a part of a base station covering the entire cell. Sectorisation is generally implemented by employing highly directional antennas that concentrate the radiated energy within a sector. FIG. 1 shows a cellular network consisting of seven cells, with each cell comprising three sectors. Hence, by way of example, the cell 10 illustrated in FIG. 1 is served by a base station 20 which can provide separate beams to cover the three sectors 30, 40, 50 provided within the cell 10.

Typically, a BS may need to communicate simultaneously with multiple SSs within a sector or a cell. Typically, such simultaneous communication can be achieved by defining multiple communication channels that can be arranged to utilise the radio resource of the wireless network. For example, in a "Time Division Multiple Access" (TDMA) system, a particular frequency channel can be partitioned in the time domain, such that a number of different signals can be transmitted in different time slots, the time slots forming multiple communication channels utilising the particular frequency channel. As another example, in a "Frequency Division Multiple Access" (FDMA) system, a band of frequencies may be partitioned to form a number of communication channels of particular frequencies, thereby enabling multiple signals to be transmitted over the radio resource. In a combined TDMA/FDMA system, such as used in WiMAX systems, a combination of time/frequency slot is used to define separate communication channels. WiMAX systems are based on the IEEE 802.16 standards that provide high-throughput broadband connections over relatively long distances.

As another example of a mechanism that can be used to establish multiple communication channels within a radio resource, in a "Code Division Multiple Access" (CDMA) system, signals may be transmitted over the radio resource on a particular frequency channel, and this frequency channel may be partitioned by applying different orthogonal codes to signals to be transmitted on that frequency channel. Signals to which an orthogonal code has been applied can be considered as being transmitted over a corresponding orthogonal communication channel utilising a particular frequency channel.

The total number of resources (i.e. channels) in a wireless network is limited. In order to increase the system capacity it may be necessary to use the same channel in different cells and/or sectors. This is known as channel re-use. The cells or sectors that use the same set of channels are known as co-channel cells or sectors, and the interference generated as a result is referred to as Co-Channel Interference (CCI). CCI degrades the quality of the received signal and thus CCI impacts negatively on the system throughput. Considering again FIG. 1, it will be noted that there are crossover regions between adjacent sectors in FIG. 1. CCI in these locations will be high, and can be avoided by using different channels on overlapping sectors.

Another way to mitigate the CCI is to use antenna arrays at the BS, such antenna arrays being described for example in Chapter 3 of the publication "Smart Antennas, Adaptive Arrays, Algorithms, and Wireless Position Location", edited by Dr T S Rappaport, IEEE, N.J. 1998, that chapter providing an introduction to smart antennas and spatial processing. An advanced (also referred to in the art as smart) antenna array consists of two or more closely spaced antennas, and in combination with a beamforming network, narrow beams with increased signal strength can be formed in the direction of the desired SS. Exploiting the spatial separation between users, the advanced antenna array can also reduce the interference to other SSs. The overall benefits of antenna arrays are increased range and improved signal strength (due to the antenna array gain), along with increased system capacity due to the efficient utilisation of spectral resources, i.e. reduced CCI.

One known type of smart antenna array is referred to as a fixed multi-beam antenna array system, where a finite number of fixed beams with predefined beam patterns and fixed pointing directions are employed. Another alternative type of smart antenna is the steered beam, or fully adaptive, antenna system. Unlike the fixed multi-beam systems, a steered beam system can radiate its energy in any direction, and in some cases can ensure little or no interference (nulling) in certain other directions. Typically, such steered beam systems are more complex to design than fixed multi-beam systems.

Considering the downlink communication from a BS (or more generically a point to multipoint device) to a particular SS (or more generically a telecommunications unit), the use of smart antenna arrays at the BS can enhance the instantaneous signal quality at the SS, but the random beam switching (and for steered beam systems, nulling) in the downlink communication will introduce random variations in the CCI, and consequently variations in the reported SINR that SSs will experience. There is an inherent delay between the time instance when a particular MCS is requested by an SS and the time instance when that SS is scheduled. If the CCI between the two instances varies significantly, then two possible outcomes can occur. Firstly, the SINR at the SS when scheduled could be higher, i.e. better, than anticipated. As a result, the requested MCS was too pessimistic. While error free transmission is more likely to occur, an alternative MCS with higher data rates could have been used instead. Alternatively, the SINR at the SS may be lower than anticipated. The requested MCS is in that case too optimistic, and the requested MCS may not be sufficiently robust enough to guarantee the desired QoS. This latter outcome is more dramatic, since many retransmissions will occur resulting in severe system throughput degradation.

Due to the complexity of design of steered beam systems, and the almost infinite variations in CCI levels that can result from the use of such steered beam systems, most systems employing smart antenna arrays for downlink communication have been based on fixed multi-beam systems. One such system is described in US 2005/0064872, which describes a technique for reducing shared downlink radio channel interference by transmitting to multiple mobiles using multiple antenna beams. In particular, a technique is described whereby abrupt time varying changes in the CCI are alleviated by scheduling to multiple mobile users using simultaneous multiple orthogonal beams per sector. The total base station power is split equally amongst the beams. Hence, if M simultaneous beams are used, then the received energy at the mobile will be reduced by M. Whilst this alleviates abrupt time varying changes in the CCI it gives rise to an elevated CCI level at all times, which impacts negatively on the system throughput.

An alternative approach also discussed in US 2005/0064872 is to retain the multiple orthogonal beams per sector, but to only use one beam at a time. To avoid rapid changes in the CCI, the beams are in such an embodiment switched at a very low rate, which gives time for the mobiles illuminated by the beam to report and experience approximately the same SINR when scheduled. When using such an approach, the above patent indicates that it is desirable to avoid synchronisation in the network in order to decrease the frequency of beam switching. A problem with the above-described approach is that for a few milliseconds after a beam switch, there are transient periods where the CCI will fluctuate rapidly. Another drawback with slow switched beam systems is that multi-user diversity is not fully exploited. Multi-user diversity is an inherent form of diversity present in all multi-user wireless communication systems. In the above-described system only parts of a sector are illuminated by a beam, and hence there may be users in other parts of the sector that experience constructive fading with signal quality that exceeds that of the signal quality of the scheduled user, but which cannot be scheduled in preference to that user due to not being illuminated by the beam in use at the time. Multi-user diversity seeks to exploit the time-varying nature of the quality of the channels by seeking to transmit data to users with the highest channel quality, thereby improving the overall system performance in terms of throughput. However, when using a slow switched beam system, it is not possible to make best use of the multi-user diversity.

Another problem with slow switched beam systems is the increase in latency resulting from the time taken to switch the beams, which can have an adverse effect on the QoS.

U.S. Pat. No. 6,438,389 describes a wireless communication system with adaptive beam selection. In particular, a wireless communication system is described having several antennas that are electronically controlled to form N distinct beams, and each one of the N beams is periodically measured for signal quality for each mobile subscriber. The two or more best beams are selected using switches controlled by a computer that stores and compares the signal quality measurements. The best beams are combined to produce a signal with improved quality.

US 2004/0235527 describes a system using multiple antenna beam base stations to provide re-use of communication channels. The system has base stations which utilise multiple beam antennas to provide a number of substantially non-overlapping antenna beams to provide directional wireless signal coverage in an area around an associated base station. Simultaneous use of channels within antenna beams of a single cell is facilitated through antenna beam isolation. A technique for reducing inter-cell interference is also discussed, where based on a number of modelling and/or empirical measurements, mutually exclusive antenna beam pairs between a "home" base station and the base stations surrounding the home base station are identified. Hence, for each beam of the home base station, beams in surrounding base stations that will experience interference if used at the same time are identified. The available resources, i.e. timeslots or frequencies, are apportioned amongst beam pairs according to their traffic needs, and a reference clock such as GPS is used to ensure synchronisation amongst the base stations of the network to ensure that beams that may interfere with each other are not used at the same time.

The above approach of producing a table of mutually exclusive beams based on modelling assumptions requires detailed two and possibly three dimensional path loss and shadow fading maps. Such maps can be obtained only through measurement reports from each and every subscriber station in the wireless network. In order to generate these maps the subscriber stations will also need to provide their co-ordinates. Managing and updating the maps is a cumbersome, memory intensive task.

Another disadvantage of the scheme proposed in US 2004/0235527 (and indeed of the earlier mentioned prior art techniques) is that the multiple antenna beam base stations described therein require calibrated arrays, which comprise of calibration units that estimate and correct any amplitude and phase distortions present in the transmit and/or receiver chain from the antenna elements down to baseband processing in the base station. Antenna architectures of this type are expensive to produce.

U.S. Pat. No. 6,804,521 describes a technique for reducing cross-beam interference in multi-beam wireless data transmission systems through temporal separation of the multiple beams. A section of a cell is geographically divided such that a number of beam patterns correspond to a number of user group areas. Downlink transmissions from a base station to a plurality of user terminals are then patterned such that transmissions to adjacent user group areas do not occur during the same time intervals. As shown for example in FIG. 8A of U.S. Pat. No. 6,804,521, sectors designated $T_1$ transmit on their respective downlink paths during first time intervals, whilst sectors designated $T_2$ transmit on their respective downlink paths during second time intervals, wherein the second time intervals do not overlap with the first time intervals. Whilst such an approach can reduce interference, CCI will still occur in sectors transmitting at the same time on the same channels. For example if the sector marked $T_2$ in cell 810 that points north east uses the same channel as the sector marked $T_2$ in cell 802 that points north east, then this latter sector will observe CCI resultant from the transmission from the aforementioned $T_2$ sector in cell 810.

Accordingly, it would be desirable to provide a technique which enabled a further reduction in CCI within a wireless network.

SUMMARY OF THE INVENTION

Viewed from a first aspect, the present invention provides a point to multipoint device for use in a wireless network to provide wireless communication with a plurality of telecommunications units, for communication from the point to multipoint device to the telecommunication units, the point to multipoint device being operable to employ multiple sets of beams, at any point in time one set being used, the point to multipoint device comprising: beam set generation logic for generating the multiple sets of beams arranged into one or more groups, each group comprising one beam from each set, within each group the beams of that group being orthogonal with respect to each other, and each beam within each set being generated randomly with respect to other beams in that set; an interface for receiving a synchronisation signal issued to all point to multipoint devices in the wireless network; beam switching logic for determining, having regard to the synchronisation signal, switch times at which the point to multipoint device switches from one set of beams to another set of beams, the switch times being the same for all point to multipoint devices in the wireless network; and an antenna array controlled by the beam switching logic for producing at any point in time one of the sets of beams for transmitting data forming the communication to the telecommunications units.

In accordance with the present invention the point to multipoint device is operable to employ multiple sets of beams, with only one set of beams being used at any point in time. The multiple sets of beams are arranged into one or more groups, with each group comprising one beam from each set, and within each group the beams are arranged to be orthogonal with respect to each other. Further, the beam set generation logic is arranged to generate beams such that each beam within each set is generated randomly with respect to other beams in that set. Further, beam switching logic is used to determine times at which the point to multipoint device switches from one set of beams to another set of beams, with these times being determined having regard to a synchronisation signal issued to all point to multipoint devices in the wireless network. As a result, a fixed number of beams are generated and the switching between sets of beams is synchronised with the other point to multipoint devices in the network. Hence, a finite number of different CCI levels will be observed. As a result, the CCI will change as a cyclostationary process. Thus, for the period between switch times the interference due to CCI is stationary, but abruptly jumps to a new CCI level following each beam set switch. The period of the cyclostationary process is equal to the Least Common Multiple (LCM) of the number of beams in each beam group used in the network. Thus, if some base stations produce two sets of beams, whilst other base stations in the network produce three sets of beams, the LCM is six, and thus the statistics of the CCI will be repeated every sixth switch period.

Additionally, in accordance with the present invention, it has been found that by arranging that each beam within each set is generated randomly with respect to other beams in that set, this results in a lower average CCI observed within the wireless network. By generating the beams within a set randomly with respect to each other, this typically results in the beams being used at any point in time having quite different beam shapes. When considering the wireless network as a whole, it is often the case that each cell is sectorised in the same way. When adopting the design of point to multipoint device of the present invention in each such cell, this means that the beams used for corresponding sectors in each cell at any point in time will typically have different shapes when compared with each other, and will also have different directions of propagation when compared with each other. These different shape and directional properties of the beams result from the random generation employed by the beam set generation logic and have been found to give rise to the lowering of the average CCI observed within the wireless network when compared with conventional systems where the beams are not randomly generated.

Further, since the switch times are synchronised across the wireless network, beam switching can occur quickly, and as a result multi-user diversity can be exploited by seeking to transmit to telecommunications units having the best channel quality.

In addition, it has been found that by arranging within each group for the beams of that group to be orthogonal with respect to each other, the envelope of the antenna gains that is obtained is greater than would be achieved if a single beam were used to cover the geographical area covered by the group.

Each set of beams may comprise one or more beams. For example, if the point to multipoint device only needs to transmit in one predominant direction, or if it is used to generate an omidirectional beam, then each set may only need to contain a single beam. At the occurrence of each switch time, the antenna array would switch to a different beam in the resultant single group. However, in alternative embodiments, the point to multipoint device may be arranged to generate multiple beams at any one time, for example a beam for each sector of a cell covered by a base station in the example where the point to multipoint device is the base station, and in such instances each set will comprise multiple beams. In one embodiment, each of the beams in the set may be arranged to use different communication channels but in an alternative embodiment one or more of the beams in a set may use the same communication channel, for example as may be possible if the directional nature of those beams meant that they would not in practice overlap. Even if each of the beams in the set produced by a particular point to multipoint device use different communication channels, other point to multipoint devices in the wireless network are likely to re-use at least some of the communication channels used by the particular point to multipoint device and accordingly the random generation of beams within the set will give rise to an overall lowering of the CCI.

In one particular embodiment, the point to multipoint device provides wireless communication within a plurality of sectors, and each group is associated with one of the sectors. Hence, at any point in time, one of the beams in the group will be transmitted in the associated sector.

In one embodiment, the point to multipoint device further comprises telecommunications unit allocation logic operable, for each telecommunications unit, to allocate that telecommunications unit to at least one of the beams based on a report signal issued to the point to multipoint device from that telecommunications unit. In one particular embodiment, the report signal is issued to the point to multipoint device at the time the telecommunications unit logs on to the wireless network, the report signal acknowledging receipt of one of the beams in the set being produced by the antenna array at that time, and the telecommunications unit allocation logic being responsive to the report signal to allocate the telecommunications unit to at least that beam received by the telecommunications unit. In some embodiments it may be appropriate to only allocate the telecommunications unit to that one identified beam. However, in alternative embodiments, the telecommunications unit allocation logic may be arranged to allocate the telecommunications unit to the associated group of beams, for example in situations where the telecommunications unit is located in quite close proximity to the point to multipoint device, and hence is likely to receive acceptable coverage from any of the beams in the group.

In one embodiment, the telecommunications allocation logic is further arranged at predetermined intervals to issue requests to each telecommunications unit for them to provide one or more report signals, for each telecommunications unit the telecommunications unit allocation logic being responsive to the provided one or more report signals to select at least one beam to allocate that telecommunications unit to. Hence, by such an approach, the at least one beam to which any particular telecommunications unit is allocated can be varied over time by the telecommunications unit allocation logic based on periodic report signals provided by that telecommunications unit.

The telecommunications units may be fixed (i.e. stationary) telecommunications units, or alternatively may be mobile telecommunications units. In the situation where the telecommunications units are mobile units, then there will typically be a need for report signals to be provided to the telecommunications unit allocation logic more frequently than would otherwise be necessary for fixed telecommunications units. In one particular embodiment of the present invention, the telecommunications units are fixed units.

The report signals can take a variety of forms. However, in one embodiment, the one or more report signals provide at least a signal quality measurement associated with a beam. There are a number of ways in which the signal quality measurement provided from the telecommunications unit to the point to multipoint device can be associated with a beam used for communication from the point to multipoint device to the telecommunications unit. In one particular embodiment, the signal quality measurement will be included in a block of communication from the telecommunications unit to the point to multipoint device that is associated with a block of communication from the point to multipoint device to the telecommunications unit, and hence the presence of the signal quality measurement within a particular block of communication will identify the associated communication block from the point to multipoint device to the telecommunications unit, and thereby identify the beam that was used for that communication.

In one embodiment, once the multiple sets of beams have been generated by the beam set generation logic, they are not changed. However, in an alternative embodiment, the beam set generation logic is operable, on occurrence of one or more predetermined events, to re-perform generation of the multiple sets of beams, thereby facilitating an evening of the quality of service provided to each telecommunications unit over time. Since each time the generation of the multiple sets of beams is re-performed, this will result in another random generation of each beam within each set, then this process will result in random changes in the shape of the beams used, and their predominant direction of propagation, and as a result this will produce an evening of the quality of service provided to each telecommunications unit over time.

Typically, there will be no need to synchronise the re-performing of the generation of the multiple sets of beams amongst multiple point to multipoint devices used within the wireless network, and indeed it will often be preferable that each point to multipoint device does not undergo such a process at the same time, but instead it may be more appropriate if at a given time instant (and for a short predetermined period) a small set of telecommunications units are re-assigned to an appropriate beam instead of re-assigning every telecommunications unit in the entire network. Every time a beam re-assignment takes place, a large amount of control signalling may be performed. The control signalling comes at the expense of user data throughput. Thus, a balance should be struck between the frequency of beam re-assignment and the anticipated improvement in the evening of the quality of service provided.

The one or more predetermined events that are used to trigger the re-performance of the generation of the multiple sets of beams can take a variety of forms. However, in one embodiment, the one or more predetermined events comprise at least an elapsing of a predetermined time interval, the predetermined time interval being larger than the period between switch times calculated by the beam switching logic. Indeed, it will typically be the case that the predetermined time interval is significantly larger than the period between switch times calculated by the beam switching logic, so as to allow the sets of beams generated by the beam set generation logic to be used for a significant period of time before a replacement sets of beams is generated, thereby reducing any impact on performance resulting from re-assigning the telecommunications units to appropriate beams.

The beam set generation logic can be arranged to produce the multiple sets of beams in a variety of ways. However, in one embodiment, the beam set generation logic is operable for each group: to generate an N×N random matrix, where N is the number of antennae in the antenna array used to generate the beams of that group, and N is equal to or greater than the number of beams in that group; to generate from the N×N random matrix an N×N unitary matrix; and to select a different column of the N×N unitary matrix to represent each beam in the group, where each entry in the column defines a beam weight to be used by a particular antenna of the antenna array when generating the associated beam. This process is then repeated for each group and has been found to provide a particularly efficient technique for ensuring that within each group the beams are orthogonal with respect to each other, whilst within each set the beams are randomly generated with respect to each other. When the number of beams in a group is less than the number of antennae N, then it will be appreciated that not all of the columns in the N×N unitary matrix will be needed, and any of those columns can be chosen to define a particular beam in the group.

The point to multipoint device may take a variety of forms. However, in one embodiment the point to multipoint device is a base station, the plurality of telecommunications units are a plurality of subscriber stations, and for downlink communication from the base station to the subscriber stations, the base station being operable to employ said multiple sets of beams. In one particular embodiment, each set comprises multiple beams and the base station provides wireless communication within a plurality of sectors, each group being associated with one of the sectors.

In an alternative embodiment, the point to multipoint device is base station sector logic, the plurality of telecommunications units are a plurality of subscriber stations, and for downlink communication from the base station sector logic to the subscriber stations, the base station sector logic being operable to employ said multiple sets of beams arranged into one group, with each set comprising one beam.

The wireless communication between the point to multipoint device and the telecommunications units can take a variety of forms. However, in one embodiment the wireless communication is composed of a plurality of frames, with downlink communication taking place during at least a portion of each frame, and the switch times determined by the beam switching logic correspond to the start of each frame. In an alternative embodiment the switch times may correspond to some other point within each frame rather than the start of each frame, or indeed in alternative embodiments the switch times may not correspond to a point in each frame, but may take place once every m-th frame.

In one particular embodiment, the wireless communication is an IEEE 802.16 communication, with each frame comprising an uplink subframe for uplink communication and a downlink subframe for the downlink communication. In such embodiments, any required report signals can be issued from a subscriber station to the base station in the uplink subframe in order to identify receipt of a beam used to form the associated downlink subframe.

In one such embodiment, the uplink subframe is separated in either time or frequency with respect to the downlink subframe.

Viewed from a second aspect, the present invention provides a wireless network comprising a plurality of point to multipoint devices, each point to multipoint device being arranged to provide wireless communication with an associated plurality of telecommunications units, and each point to multipoint device being a point to multipoint device in accordance with the first aspect of the present invention, wherein the multiple sets of beams generated by each point to multipoint device are randomly generated with respect to each other. As a result, all of the beams used at any point in time within the wireless network for communications from a point to multipoint device to associated telecommunications units are all generated randomly with respect to each other. Further, within any group of beams within the wireless network, each beam in that group is orthogonal with respect to other beams in the group. As discussed earlier, it has been found that such an approach leads to a lowering of the average CCI observed within the wireless network.

Viewed from a third aspect, the present invention provides a method of operating a point to multipoint device used in a wireless network to provide wireless communication with a plurality of telecommunications units, for communication from the point to multipoint device to the telecommunication units, the point to multipoint device employing multiple sets of beams, at any point in time one set being used, the method comprising the steps of: generating the multiple sets of beams arranged into one or more groups, each group comprising one beam from each set, within each group the beams of that group being orthogonal with respect to each other, and each beam within each set being generated randomly with respect to other beams in that set; receiving a synchronisation signal issued to all point to multipoint devices in the wireless network; determining, having regard to the synchronisation signal, switch times at which the point to multipoint device switches from one set of beams to another set of beams, the switch times being the same for all point to multipoint devices in the wireless network; and controlling an antenna array to produce at any point in time one of the sets of beams for transmitting data forming the communication to the telecommunications units.

BRIEF DESCRIPTION OF THE DRAWINGS

The present invention will be described further, by way of example only, with reference to embodiments thereof as illustrated in the accompanying drawings, in which:

FIG. 6 is a table illustrating the period of the cyclostationary process that CCI is found to follow when adopting synchronised beam switching in accordance with embodiments of the present invention;

DESCRIPTION OF EMBODIMENTS

Figure 1:
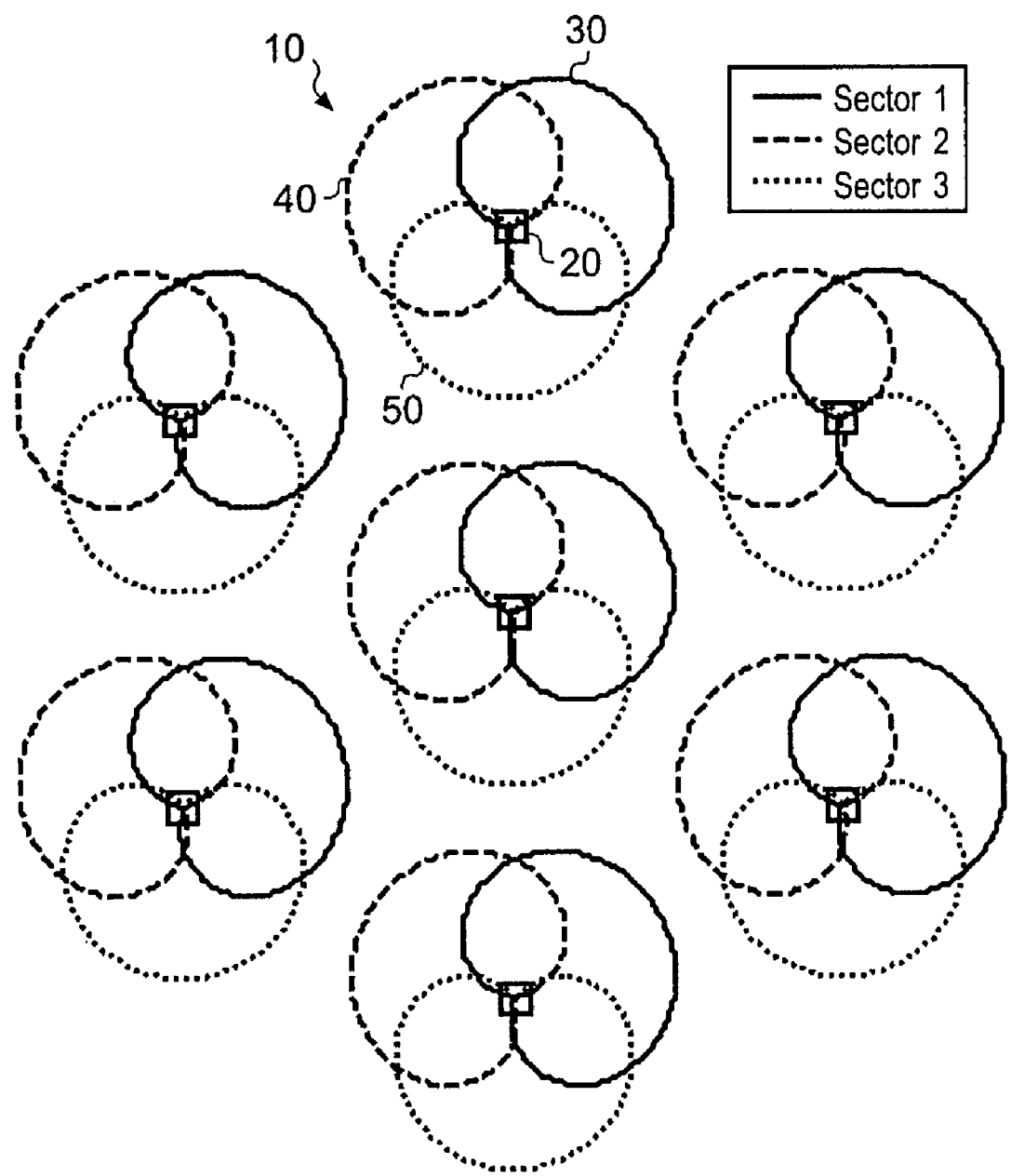
FIG. 1 is a block diagram of a wireless network in accordance with a prior art technique.
Figure 2:
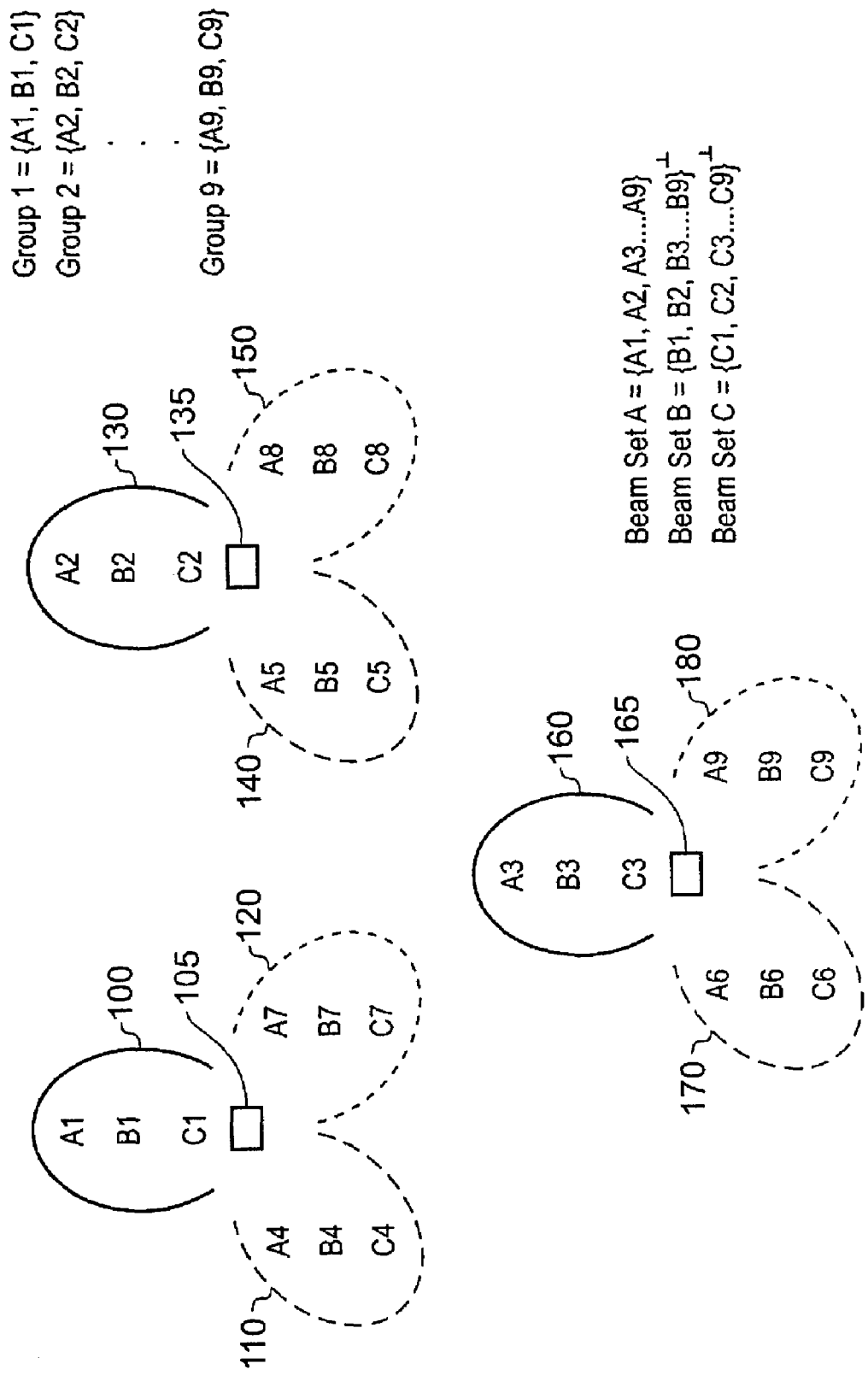
FIG. 2 is a diagram illustrating the concept of sets of beams and groups of beams as used in embodiments of the present invention.

The techniques of embodiments of the present invention can be applied to a variety of different point to multipoint devices that employ fixed multibeam techniques when communicating with a plurality of telecommunications units, such communications hence being point to multipoint communications. For the purposes of describing an embodiment of the present invention, a base station is considered as an example of such a point to multipoint device, with the base station (BS) being provided within a cell of a wireless network for communicating with a plurality of subscriber stations (SSs) provided within that cell. FIG. 2 is a diagram schematically illustrating three BSs 105, 135, 165 that may be provided within a wireless network in association with three telecommunications cells. Each cell is divided into three sectors, and each base station is arranged to use one or more antenna arrays to transmit into the sectors using different beams. Hence, the base station 105 may have an antenna array via which it can produce a beam for transmission into the sector 100, a beam for transmission into the sector 110 and a beam for transmission into the sector 120.

In accordance with embodiments of the present invention, each base station has beam set generation logic which can generate multiple sets of beams arranged into one or more groups, at any point in time one set being used. These sets are referred to schematically in FIG. 2 as set A, set B and set C. Hence, considering BS 105, its beam set generation logic will generate a set consisting of beams A1, A4 and A7, will produce a further set consisting of beams B1, B4, B7, and in addition will produce a third set consisting of beams C1, C4 and C7. At any point in time, BS 105 will transmit into its three sectors 100, 110, 120 using one of the sets of beams that it has generated.

The BSs 135 and 165 operate in the same manner to produce their corresponding three sets of beams. The beams are also arranged into groups, with each group being associated with a particular sector of a cell. Hence, considering again base station 105, three groups of beams are generated, the first group comprising beams A1, B1, C1, the second group comprising beams A4, B4, C4 and the third group comprising beams A7, B7, C7. In accordance with embodiments of the present invention, the beams within each group are orthogonal with respect to each other, which as mentioned earlier results in the envelope of the antenna gains obtained being greater than would be achieved if a single beam were used to cover the geographical area covered by the group. Further, considering any particular set, each beam within that set is generated randomly with respect to other beams in that set. Accordingly, considering base station 105 as an example, the beams A1, A4 and A7 are generated randomly with respect to each other, as are the beams B1, B4 and B7, and the beams C1, C4 and C7, this being done whilst observing the constraint that within any particular group the beams are orthogonal with respect to each other.

Due to the random nature of the generation of beams in each set, it will be appreciated that even though the beam set generation logic in each BS 105, 135, 165 will operate independently of each other, the three separate sets of beams that those BSs generate can be considered collectively to form an enlarged set where each beam in the set is still generated randomly with respect to any other beam in the set. Accordingly, assuming a simple case where the wireless network consisted of only the three BSs 105, 135, 165 shown, then it will be seen that there is a network wide beam set A that consists of beams A1 to A9, a network wide beam set B which consists of beams B1 to B9, and a network wide beam set C that consists of beams C1 to C9. In any particular network wide set, each beam is generated randomly with respect to any other beam in that set, and for each group the beams in that group will be orthogonal with respect to each other.

In accordance with embodiments of the present invention, each base station 105,135, 165 in the network is arranged to receive a synchronisation signal, and to determine times at which to switch between the various sets of beams dependent on that synchronisation signal, such that each base station in the wireless network switches between its sets of beams at the same time. In one embodiment, the communication between each BS and the associated SSs in its cell are formatted into frames, and the synchronisation signal is used to ensure that each BS switches between its sets of beams at the start of a frame. There are a number of ways in which such switching could be achieved. For example, each BS may be arranged to switch between its beam sets at the start of each frame, or could alternatively could be arranged to switch only every m-th frame. Alternatively, each base station may be arranged to switch between its sets of beams part way through a frame. This may for example be possible if the downlink communication from each BS to its associated SSs takes place during a particular part of a frame and the start time of that part of the frame is the same for all BSs in the network.

In one particular embodiment of the present invention, the wireless communication between each BS and its associated SSs is an IEEE 802.16 communication, with each frame comprising an uplink subframe for the uplink communication from an SS to its associated BS, and a downlink subframe for the downlink communication from a BS to its associated SSs. In accordance with the IEEE 802.16 communications standard, the uplink subframe may be separated in either time or frequency with respect to the downlink subframe. The downlink subframes may or may not be arranged to start at the same time across the entire wireless network.

Figure 3:
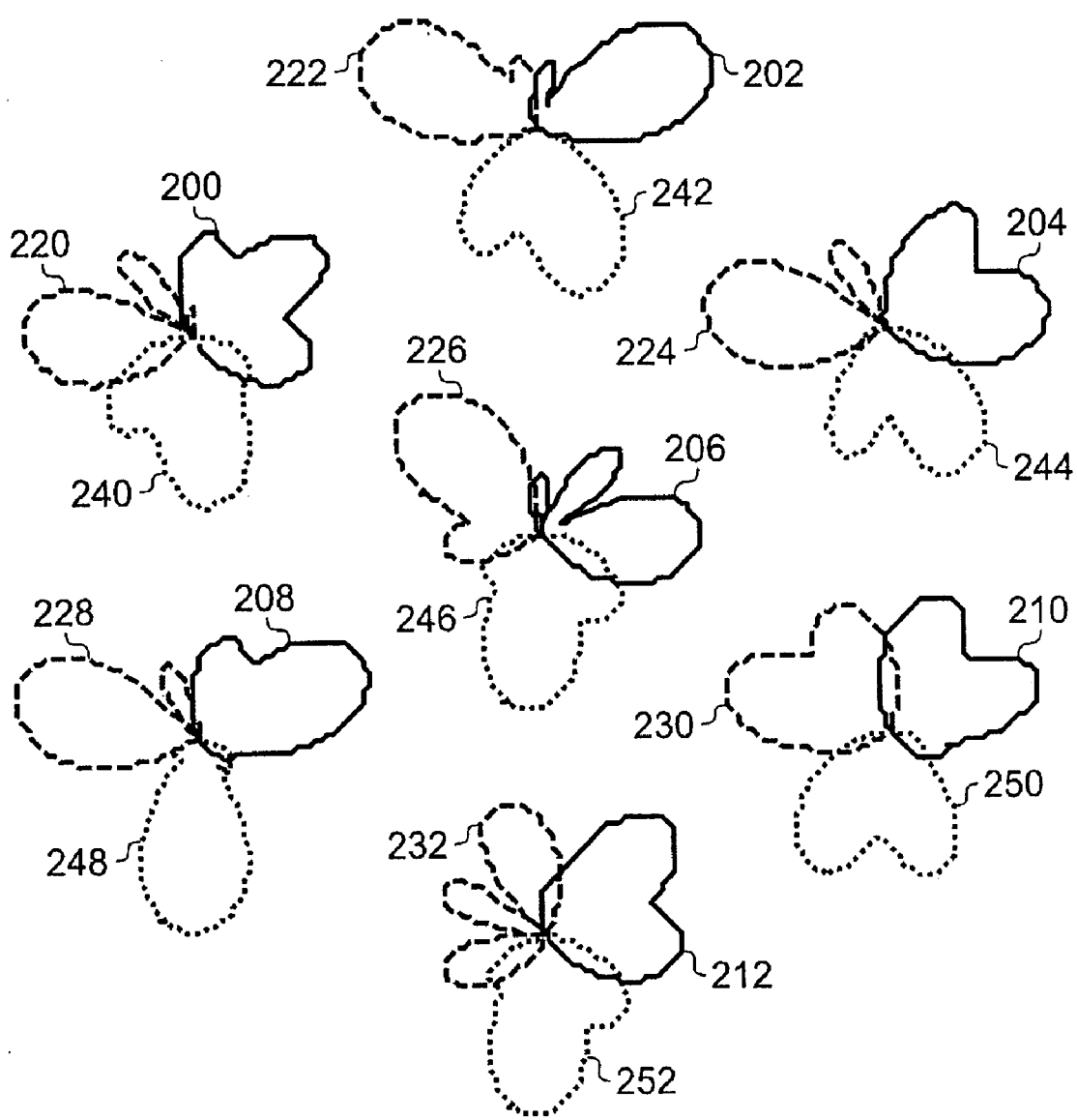
FIGS. 3, 4 and 5 illustrate different sets of randomly generated beams that may be used in different frames by a number of base stations in a wireless network in accordance with one embodiment of the present invention.
Figure 4:
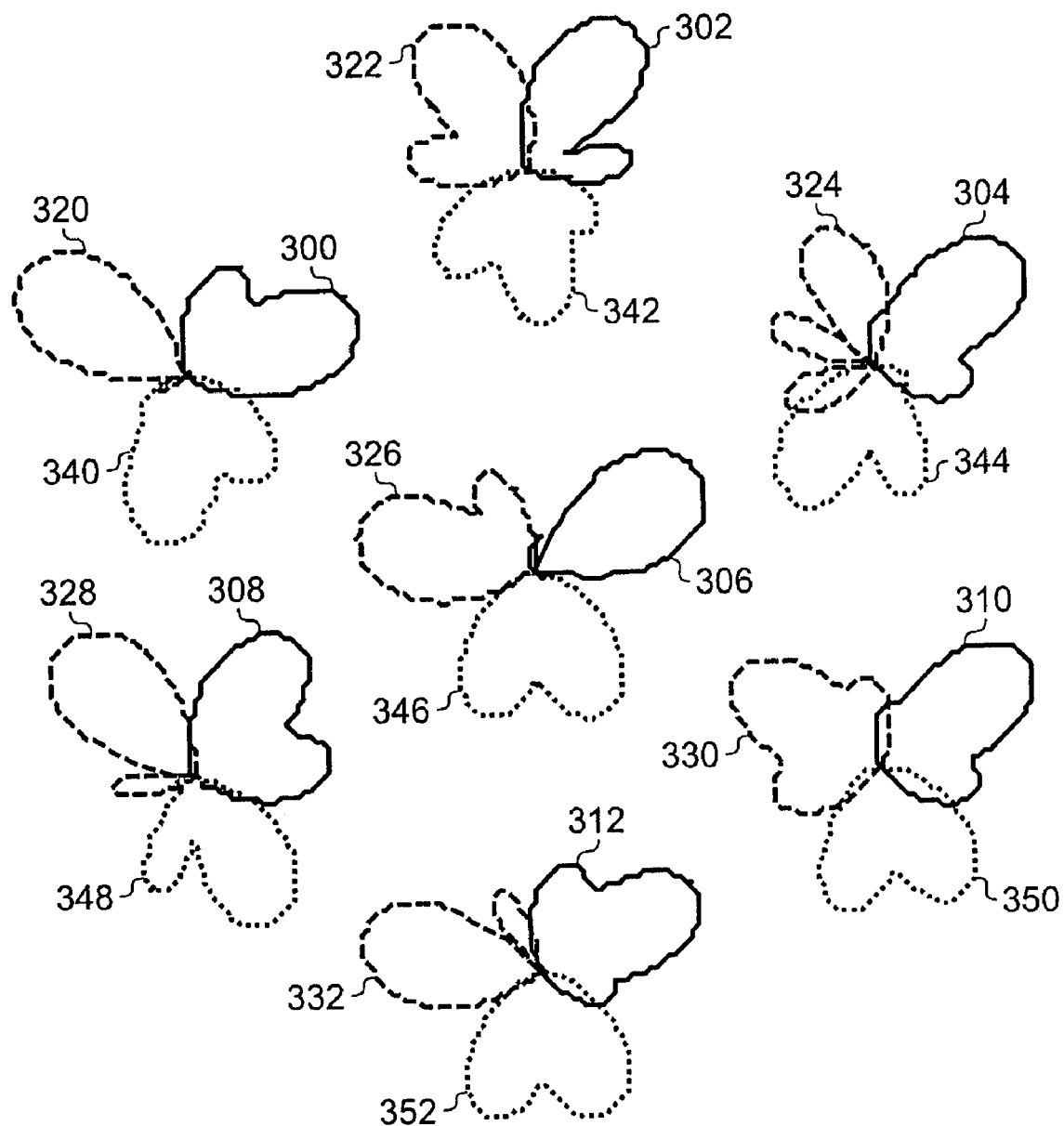
Figure 5:
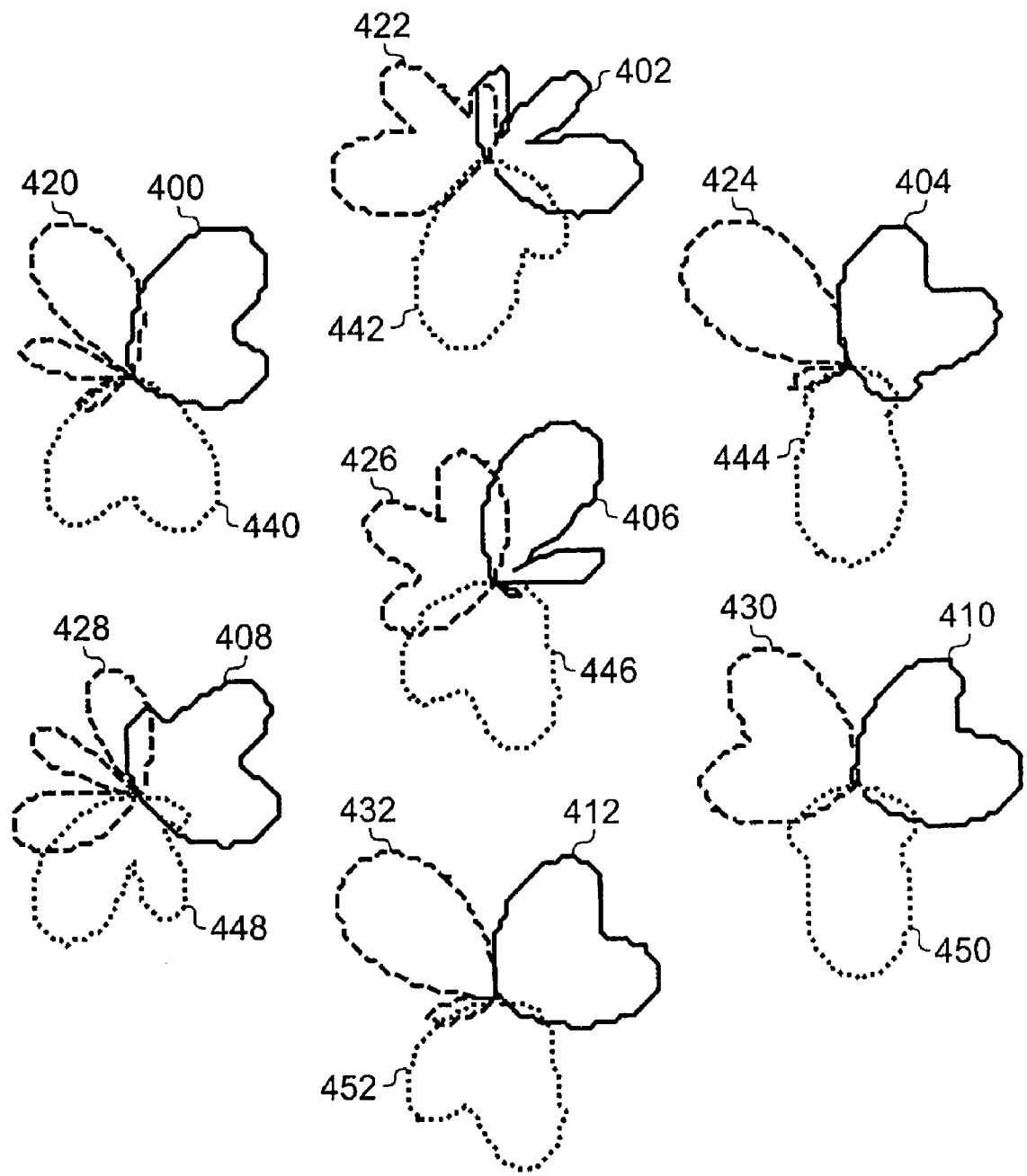

FIGS. 3 to 5 illustrate examples of random beam sets that may be used in separate frames in accordance with one embodiment of the present invention. In this example, the patterns associated with seven BSs are shown, although it will be appreciated that the wireless network may have considerably more than seven BSs therein. As with the earlier examples, each BS cell is considered to consist of three separate sectors. FIG. 3 shows the beams that may be used by each BS for frame numbers 0, 3, 6, 9, etc. FIG. 4 shows the beams that may be used for frame numbers 1, 4, 7, 10, etc, and FIG. 5 shows the beams that may be used for frames 2, 5, 8, 11, etc. Hence, in this example FIG. 3 can be seen to illustrate beam set A for each base station (which may be considered to provide an overall network wide beam set A), FIG. 4 illustrates a beam set B for each base station (which may be considered to form a network wide beam set B), and FIG. 5 illustrates a beam set C for each BS (which may considered to form a network wide beam set C). All of the beams in the network wide beam set A, namely beams 200, 202, 204, . . . , 248, 250, 252, are randomly generated with respect to each other. Similarly, all of the beams in beam set B, namely beams 300, 302, 304, . . . , 348, 350, 352 are generated randomly with respect to each other, and similarly all of the beams of beam set C, namely beams 400, 402, 404, . . . , 448, 450, 452 are generated randomly with respect to each other. Further, within each group, the beam set generation logic within each BS ensures that the beams within that group are orthogonal with respect to each other. Hence, by way of example, the beams 202, 302, 402 are orthogonal with respect to each other.

The use of such randomly generated beams has been found to significantly reduce the CCI levels within the wireless network. This is due to the fact that the beams being broadcast simultaneously using the same channel have different shapes and different predominant directions of transmission, and this has been found to give rise to an overall lowering in the level of CCI, particularly that occurring between cells. As an example, it may be the case considering FIG. 3 that each of the beams 200, 202, 204, 206, 208, 210, 212 are transmitted on the same channel, whilst the beams 220, 222, 224, 226, 228, 230, 232 are broadcast on a different channel, and the beams 240, 242, 244, 246, 248, 250, 252 are broadcast on a further channel. In a typical prior art system, the beams using the same channel are likely to have a similar shape and predominant direction of propagation, and this gives rise to CCI within each sector. However, by employing the techniques of embodiments of the present invention, this CCI level is observed to be significantly reduced. This is due to the different beam shapes and directions of propagation exhibited by each of the beams using the same channel (for example compare and contrast the beams 200, 202, 204, 206, 208, 210, 212 in FIG. 3).

In addition to giving rise to a reduction in the CCI level observed within the wireless network, embodiments of the present invention can also give rise to other advantages. In the example discussed above, each BS transmits into each sector using a single beam for the duration of a frame. As a result, maximum transmit power can be used enabling higher data rates and longer range extensions. This is in contrast to a Spatial Division Multiple Access (SDMA) approach, where power is split (typically equally) among the simultaneously transmitted beams.

In accordance with one embodiment of the present invention, beam switching occurs at the beginning of each frame, and a number of SSs will be scheduled within that frame, for example using TDMA principles. Multi-user diversity can be exploited since fast beam switching is used in embodiments of the present invention. In a wireless multi-user telecommunications system, the channel quality varies with time, this property being known as fast fading. At any given time instant some SSs will experience better channel conditions than others. If data can be transmitted to the SSs with the highest channel quality then the overall system performance (measured in throughput) will be improved. Multi-user diversity exploits this time-varying nature of the SSs channels. In one embodiment of the present invention, different levels of fading are in fact artificially generated (due to CCI) and such embodiments seek to schedule the user group(s) (i.e. those SSs associated with a particular beam) with the best channel quality.

In accordance with embodiments of the present invention, the entire network is synchronised, and in particular every BS in the network receives a common synchronisation signal, for example a signal generated by a common external clock. Beam switching then occurs in a synchronised fashion, in one embodiment this occurring at the start of each frame. As a result, the CCI observed by any particular SS is stationary for the duration of the frame, but abruptly jumps to a new CCI level at the beginning of each frame. As a result, the CCI follows a cyclostationary process. The period of the cyclostationary process is equal to the Least Common Multiple (LCM) of the various sets of beams used in the wireless network. FIG. 6 is a chart illustrating the various CCI levels observed by a particular SS which, say, is associated with a particular base station referred to as BS0, but which observes some CCI due to beams on the same channel issued by other base stations, namely BS1 and BS2. As shown in FIG. 6, BS1 transmits on frame zero using beam "a", on frame one using beam "b", on frame two using beam "c", and then on the next frame reverts back to beam "a", etc. BS2 similarly uses the following sequence of beams: "A, B, C, A, etc". The contribution of beams "a" and "A" gives rise to CCI level "L1", beams "b" and "B" give rise CCI level "L2", beams "c" and "C" give rise to CCI level "L3", etc. The LCM of three and three is three, and thus the statistics of the CCI is repeated every third frame.

It should be noted that it is not essential that each BS produces the same number of sets of beams. For example one set of BSs may produce three fixed beams per group, such as was discussed earlier with reference to FIG. 2, whilst other BSs in the network may produce two beams per group, i.e. produce two sets of beams. The LCM of two and three is six, and thus in such embodiments the statistics of the CCI will be repeated every sixth frame.

As will be discussed later, in one embodiment each SS is associated with a particular beam within a beam group serving its geographical area, and hence gets scheduled time as required when that particular beam is used. In order to minimise the latency in the proposed scheduling policy, it is advantageous to keep the LCM as low as possible (for example 2 or 3), but at the same time ensuring high user and system throughput.

Figure 7:
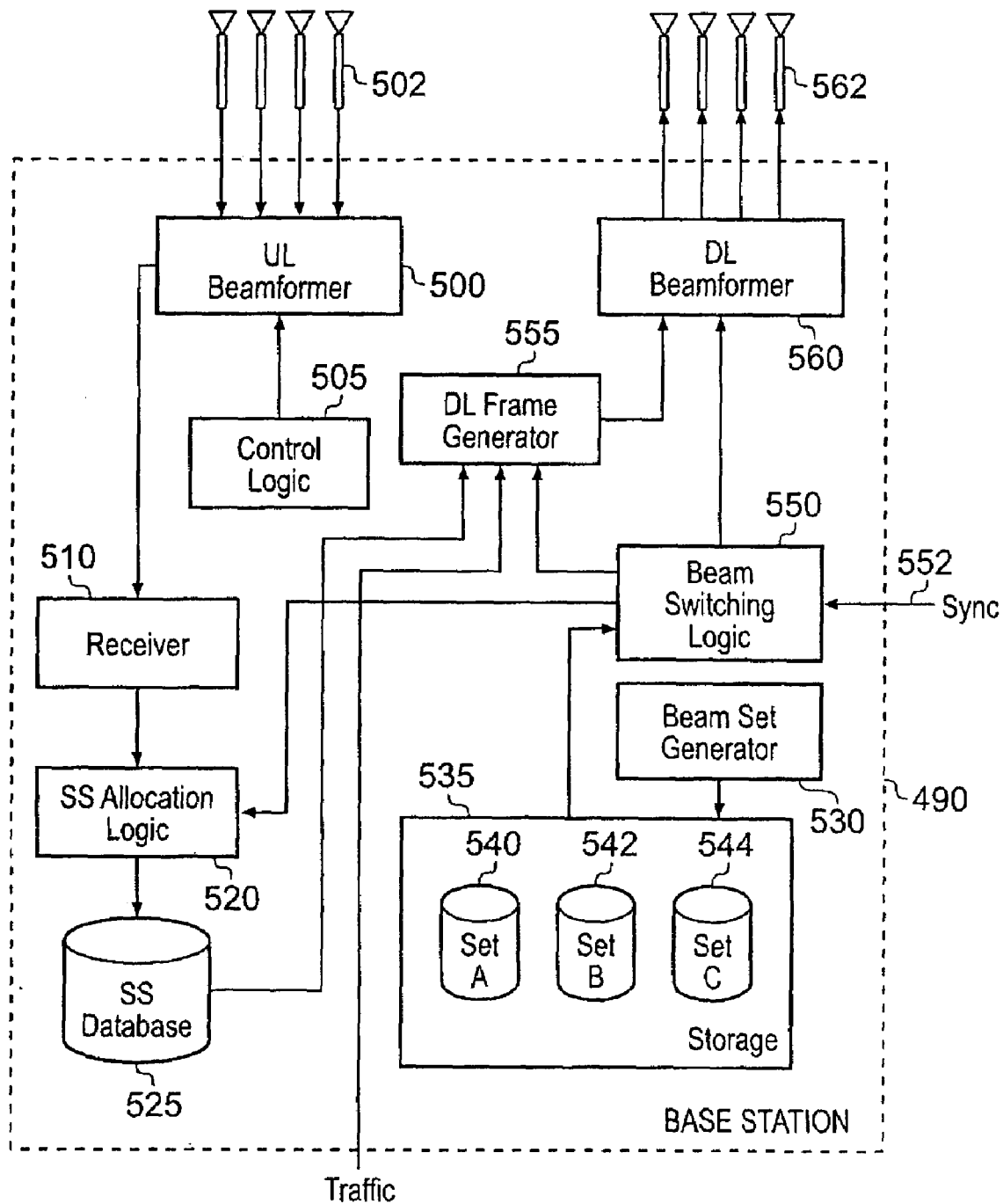
FIG. 7 is a block diagram of a base station in accordance with one embodiment of the present invention.

FIG. 7 is a block diagram illustrating a base station in accordance with one embodiment of the present invention. The base station 490 illustrated in FIG. 7 has an uplink antenna array 502 controlled by uplink beamformer logic 500 to receive signals issued to the base station 490 from SSs within the cell covered by the base station. The uplink beamformer circuit 500 is controlled by control logic 505 and can be arranged to apply weights to the uplink antenna array 502 in accordance with any of a number of known techniques in order to seek to optimise reception of signals from SSs within the cell.

In accordance with embodiments of the present invention, a downlink antenna array 562 is provided which is controlled by downlink beamformer logic 560 to produce at any point in time a set of beams, where each set may contain one or more beams. As will be discussed in more detail later, beam set generator logic 530 is arranged to generate multiple sets of beams, in this example set A 540, set B 542 and set C 544, which are then stored in storage 535 for use in driving the downlink beamformer logic 560. In one particular embodiment, the base station covers multiple sectors, and for each sector a group of beams is allocated consisting of one beam from set A, one beam from set B and one beam from set C. The beams within the group are orthogonal to each other. Hence, taking a specific example, if the base station 490 had four sectors associated therewith, then each set 540, 542, 544 would typically comprise four beams, such that four groups of three beams each are stored within the storage 535.

Beam switching logic 550 is then provided for issuing to the downlink beamformer logic 560 set defining information which at any point in time identifies the beams within one of the sets 540, 542, 544, the beam switching logic 550 being arranged to switch between the sets based on a synchronisation signal 552 received from a common external clock. The set defining information will typically consist of an identification of beam forming weights to be applied to the individual antennas of the antenna array 562 in order to produce the one beam per sector output by the base station for any particular frame. Accordingly, during a first frame, the beam switching logic 550 may output beam forming weights defined for set A 540, and during a subsequent frame will then output the beam forming weights associated with set B 542, and thereafter in a subsequent frame output the beam forming weights associated with set C 544.

When an SS signs onto the network, it will typically seek to identify an acceptable communication link. In particular, it will signal back to the base station 490 an indication of a frame for which it experienced an acceptable communication link. This information will typically be included in the uplink communication received at the antenna array 502, and will be routed via the uplink beamformer logic 500 to the receiver 510. This frame identification will then be routed to subscriber station allocation logic 520. The SS allocation logic 520 will then be able to identify from the frame number the particular beam set that was used. Also, a sector ID included in the received signal will identify the channel in which the indication was received, and the SS allocation logic 520 can then determine with reference to the beam switching logic 550 which actual beam within the relevant group was received by the SS.

Once the SS allocation logic has determined which beam was observed by the SS, it then allocates that beam to the SS within the SS database 525. Hence, as each SS associated with the base station 490 signs on, it will be allocated an entry in the SS database 525 identifying a beam which can be used to communicate with that SS.

The data traffic to be routed to an SS associated with the base station 490 is received by the downlink frame generator 555. The downlink frame generator 555 knows from the beam switching logic 550 which sets of beams 540, 542, 544 are being used at any particular point and also knows from the SS database 525 which SSs are associated with which beams. Using this information, the downlink frame generator 555 will hence schedule the traffic according to the SS to which it is destined, and a knowledge of which beam should be used to communicate with each SS. As an example, if some of the data traffic is destined for a particular SS which is associated with a beam from set B 542, but set A 540 is to be used for the next frame, then the downlink frame generator 555 will schedule another packet of data traffic destined for an SS that is associated with a beam from set A 540 ahead of the data traffic for the SS associated with beam set B, and instead will hold that data traffic back until beam set B 542 is being used, at which point that data traffic can be scheduled for inclusion in the downlink portion of the frame.

It will be appreciated by those skilled in the art that the downlink subframes themselves can be constructed in a variety of ways, and as an example the format of each subframe may be defined by a particular Standard that the communication conforms to.

Figure 8:
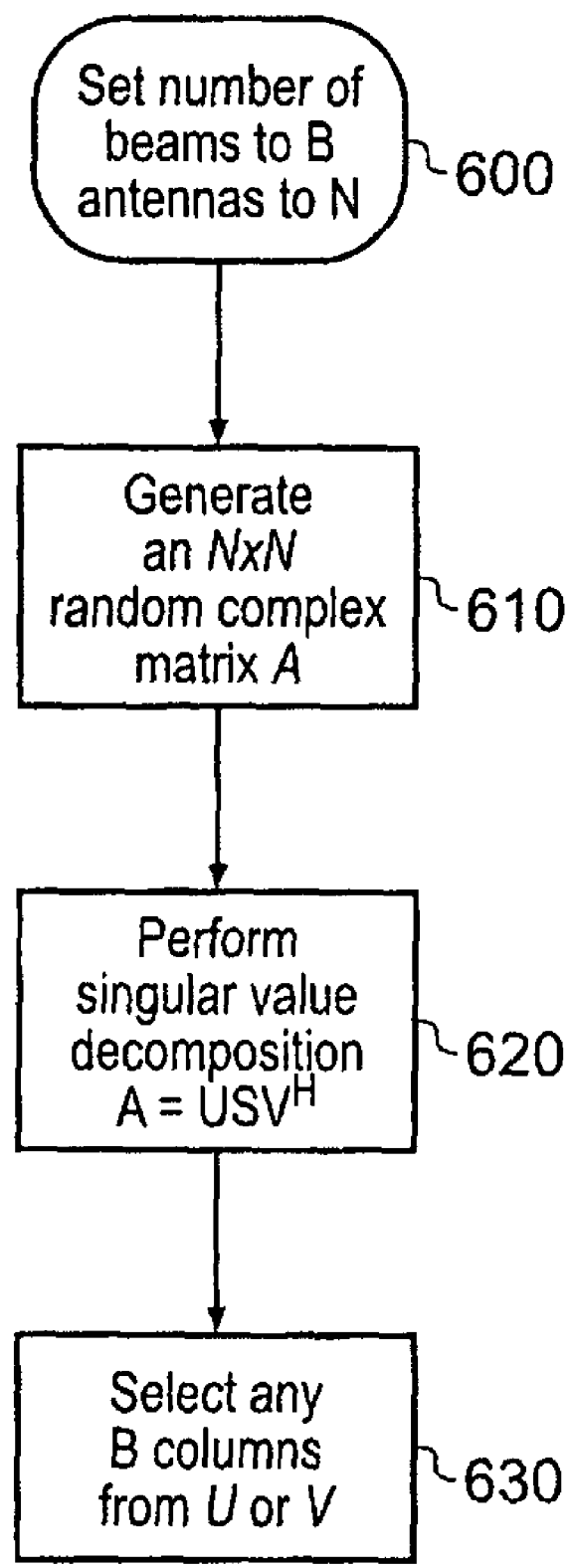
FIG. 8 is a flow diagram illustrating for a particular group of beams a method that may be employed in one embodiment by the beam set generator of the base station of FIG. 7 in order to generate the beams in that group.

The beam set generator 530 of FIG. 7 can be arranged in a variety of ways, provided that it produces multiple sets of beams arranged into one or more groups, with each group comprising one beam from each set, and within each group the beams of that group being orthogonal with respect to each other, whilst within each set the beams of that set being generated randomly with respect to each other. FIG. 8 is a flow diagram illustrating the process performed in one embodiment to generate the beams of each group.

At step 600 that the number of beams B in each group is defined, as is the number of antenna elements N (i.e. the number of antennae in the array 562 used to produce beams in that group). In accordance with this embodiment, it is required that the number of beams B is less than or equal to the number of antenna elements N.

Thereafter at step 610, an N×N random complex matrix A is generated by the beam set generator 530.

A unitary matrix satisfies the condition $U^H U = I$, where I is the identity matrix and $U^H$ denotes the conjugate (Hermitian) transpose of U. The columns of U form an orthonormal set $\{u_1, u_2, \ldots, u_N\}$ where the vectors are mutually perpendicular and of unit norm, i.e.

$$u_k^H u_l = \begin{cases} 0, & \text{for } k \neq l \\ 1, & \text{for } k = l \end{cases}$$

Generation of unitary matrices is well known in the art. An example of a unitary matrix generation method is the singular value decomposition (SVD): starting from the random N×N matrix A generated at step 610, the singular value decomposition of A is performed at step 620 and yields $$A = USV^H$$

where U and V are unitary matrices, and S is a diagonal matrix whose elements are the singular values of A. The desired unitary beamforming matrix can be set to either U or V. Thereafter any B columns from U or V are selected at step 630 to form the beam forming weights for each beam in the group.

EXAMPLE

Let the number of antennas N=3 and the number of beams B=3. Let the random matrix A be given by $$A = \begin{bmatrix} -0.4521 - 0.9715i & 1.4041 - 1.2118i & -1.2413 + 1.4178i \\ -2.0185 + 1.0302i & 0.3496 - 1.2731i & 0.2494 + 1.3642i \\ 1.6444 - 0.4617i & 0.1980 + 2.1392i & -0.8949 - 0.0644i \end{bmatrix}$$

SVD returns the unitary matrix U, which is given by $$U = \begin{bmatrix} -0.3763 - 0.4220i & 0.3891 + 0.4194i & 0.5022 - 0.3175i \\ -0.5802 + 0.1239i & -0.1419 + 0.5469i & -0.4667 + 0.3333i \\ 0.5157 - 0.2498i & 0.4954 + 0.3287i & -0.5528 - 0.1121i \end{bmatrix}$$

Thus, on frame number one the beam vector weight $u_1$ would be used. On frame number 2 the beam vector weight $u_2$ would be used and on frame number 3 the beam weight $U_3$ would be used. The beam weights are given by $$u_1 = \begin{bmatrix} -0.3763 - 0.4220i \\ -0.5802 + 0.1239i \\ 0.5157 - 0.2498i \end{bmatrix}$$

$$u_2 = \begin{bmatrix} 0.3891 + 0.4194i \\ -0.1419 + 0.5469i \\ 0.4954 + 0.3287i \end{bmatrix}$$

$$u_3 = \begin{bmatrix} 0.5022 - 0.3175i \\ -0.4667 + 0.3333i \\ -0.5528 - 0.1121i \end{bmatrix}$$

For example on frame number 3, the data is weighted by 0.5022−0.3175i and transmitted from the first antenna. During frame number 3, the data is also weighted by −0.4667+0.3333i and transmitted from the second antenna and finally, the data is weighted by −0.5528−0.1121i and transmitted from the third antenna.

The above described process produces a definition of the beams for each group, and this process is repeated for each subsequent group produced by the beam set generation logic. For example, for a base station 490 composed of three sectors, the process will typically be repeated three times to produce three different groups of beams, one for each sector. Because at step 610 an N×N random complex matrix is generated, it will be seen that within each set the beams are generated randomly with respect to each other.

Figure 9:
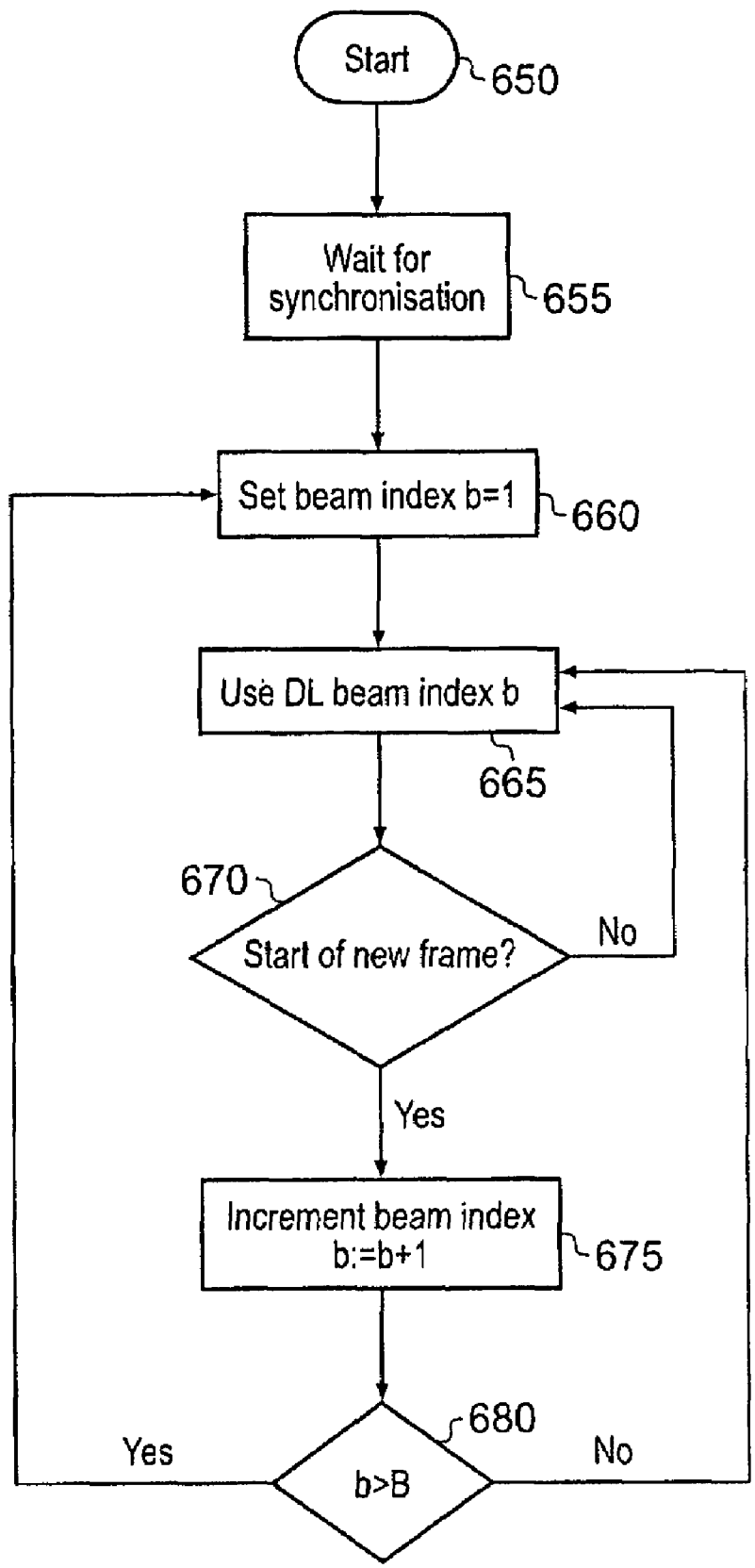
FIG. 9 is a flow diagram illustrating the beam switching algorithm that may be employed by the beam switching logic of the base station of FIG. 7 in accordance with one embodiment of the present invention.

FIG. 9 is a flow diagram illustrating the operation of the beam switching logic 550 of FIG. 7 in accordance with one embodiment. Following starting of the process at 650, the beam switching logic 550 waits for synchronisation at step 655. This will be achieved upon receipt of the sync signal over path 552 from the common external clock. Thereafter, at step 660, a beam index value b is set equal to one. Thereafter at step 665 the beam switching logic 550 routes to the downlink beamformer circuit 560 the beamforming weights for the set associated with the beam index b. Hence, considering FIG. 7, a beam index b of one may be associated with set A 540.

At step 670, it is determined whether a new frame has started. If not, the same beam index is used to generate the beamforming weights passed to the downlink beamformer circuit 560. However, upon the start of a new frame, the process proceeds to step 675, where the beam index b is incremented. Thereafter, at step 680, it is determined whether b is greater than B, i.e. the number of beams in a beam group. If not, then the process returns to step 665, where the new incremented beam index is used by the beam switching logic 550 to output a new set of beamforming weights to the downlink beamformer circuit 560. Hence, with reference to FIG. 7, this now causes a new set of beams to be used.

If at step 680, it is determined that b is greater than B, then the process returns to step 660, where the beam index is reset to one, whereafter the process continues.

In the above example, it will be seen that the synchronisation signal received over path 552 only needs to be received once at start up. However, in alternative embodiments, the sync signal may be received more often in order to ensure that the switch timing within each base station does not begin to drift with respect to the timing in other base stations. The process of FIG. 9 could then be repeated each time the synchronisation signal is received. Alternatively, the new synchronisation signal could just be used to affect the determination of the start of a new frame at step 670.

Figure 10:
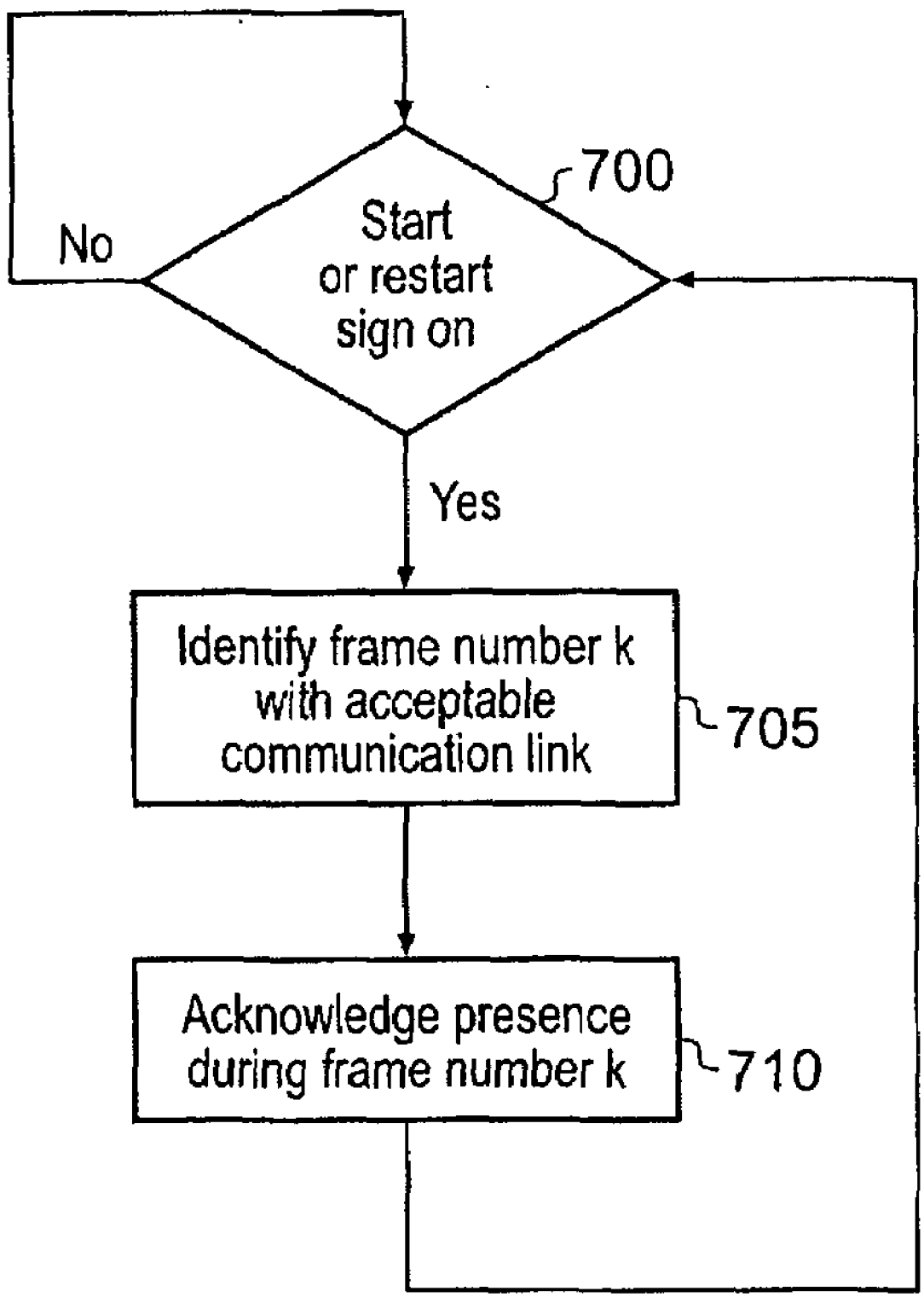
FIG. 10 is a flow diagram illustrating a process that may be performed by a subscriber station in order to identify receipt of a particular beam in accordance with one embodiment of the present invention.

FIG. 10 is a flow diagram illustrating the process that may be performed at an SS when signing onto the wireless network in order to enable the base station 490 to allocate that SS to a particular beam. It will be appreciated that the SS will typically undergo further procedures other than those illustrated in FIG. 10, but FIG. 10 is merely intended to illustrate the steps required for allocating an SS to a particular beam. At step 700, the sign on process is started or re-started, whereafter at step 705 the SS monitors downlink communication in order to identify a frame number with an acceptable communication link. Thereafter, at step 710, the SS acknowledges its presence during that particular frame. In one particular embodiment, a downlink subframe includes an uplink map identifying the format of an associated uplink subframe. If the SS receives that downlink subframe with an acceptable SINR, it will acknowledge its presence by including an appropriate signal in the associated uplink subframe routed to the base station. In accordance with such an embodiment, it is important for the SS to acknowledge its presence during the frame when the channel quality is acceptable, since it is the inclusion of the signal in the associated uplink subframe that enables the base station to identify the downlink subframe that the SS found acceptable. However, it will be appreciated that in alternative embodiments, that there may be alternative mechanisms by which the SS can identify to the base station a particular downlink subframe that it receives with an acceptable SINR, and in such cases it may not be necessary for that information to be routed back to the base station during the same frame. For example, instead, the SS may signal back the frame number when the frame is correctly decoded.

As discussed earlier with reference to FIG. 7, once the acknowledgement issued by an SS at step 710 is received by the BS, the SS allocation logic within the BS can then allocate that SS to a particular beam that it knows was used for the frame in question, with this information being stored in the SS database 525 for subsequent use when scheduling downlink communication to that SS.

Figure 11:
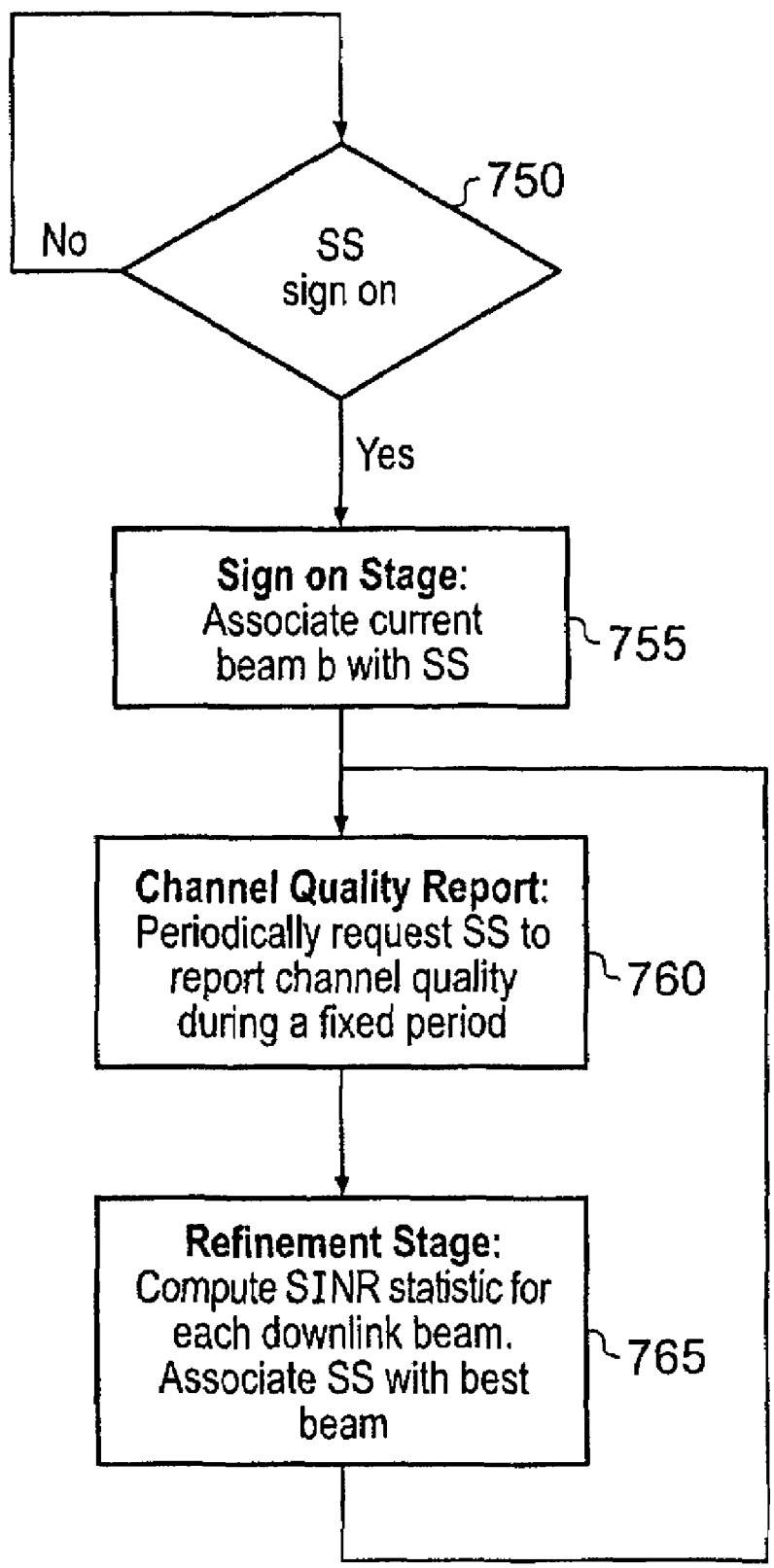
FIG. 11 is a flow diagram illustrating the process performed by the subscriber station allocation logic of FIG. 7 in accordance with one embodiment of the present invention.

FIG 11 illustrates a refinement process that may be used to periodically update the assignment of individual SSs to particular beams. At step 750, a particular SS signs onto the network, whereafter at step 755 the sign on process described earlier with reference to FIG. 10 is performed in order to associate with that SS a particular beam, this information then being stored within the SS database 525.

Thereafter, at step 760, the SS allocation logic 520 is arranged to periodically request an SS to report channel quality during a fixed period of time. For example, if the base station has three beams in each group, then the base station may ask the SS to provide an SINR indication for each frame for a fixed period which is multiple of three. As a particular example, the base station may ask the SS to provide SINR values for thirty frames, which hence provides ten SINR values for each of the three beams in the group.

Thereafter, at step 765, the SS allocation logic 520 can compute the SINR statistic for each downlink beam averaged over the fixed period for which the SS was asked to report. Using the earlier example, this SINR statistic can be averaged across ten values received for each beam. Thereafter, the SS allocation logic 520 can allocate to the SS the best beam, i.e. the one with the best SINR statistic. This may be the same beam that was originally associated with the SS at step 755, but may in fact be a different beam, for example due to changes in conditions affecting the communication path, or because the SS made a sub-optimal choice in the first instance.

Step 760 and 765 can then be repeated periodically as required. The above refinement stage adopts the policy that the BS is best placed to compute the SINR and the corresponding MCS appropriate to a particular SS, since the BS has knowledge of the underlying cyclostationary nature of the CCI. If P denotes the period of the cyclostationary process of the CCI, the average SINR is computed using every SINR report from the SS. In an alternative approach, the SS could itself be arranged to compute an SINR by averaging current and previous SINR estimates, but for this to be an effective approach the SS would have to have knowledge of the underlying cyclostationary nature of the CCI, so that it can make sure that the correct values are averaged, for example every third value assuming the cyclostationary process repeats every third frame.

By use of embodiments of the present invention, a particularly efficient point to multipoint communication within a wireless network can be achieved, using a fixed multibeam approach. At any point in time, one set of beams is used, and each beam in that set is generated randomly with respect to other beams in that set. This has been found to give rise to a significant reduction in the CCI observed at recipient telecommunications units within the wireless network.

Figure 12:
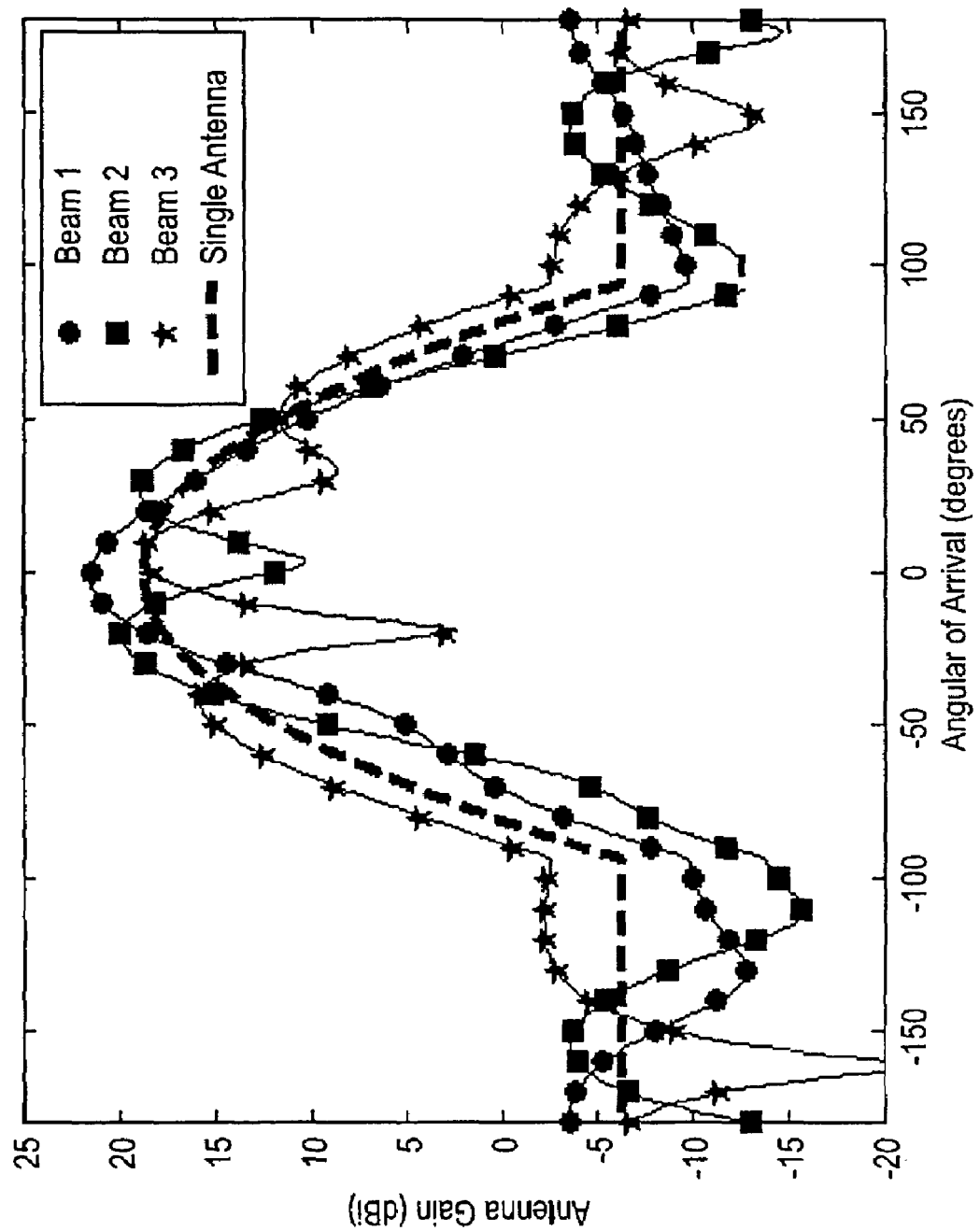
FIGS. 12 and 13 are diagrams illustrating simulated results obtained when using random orthogonal beams for each group, and random non-orthogonal beams for each group, respectively.
Figure 13:
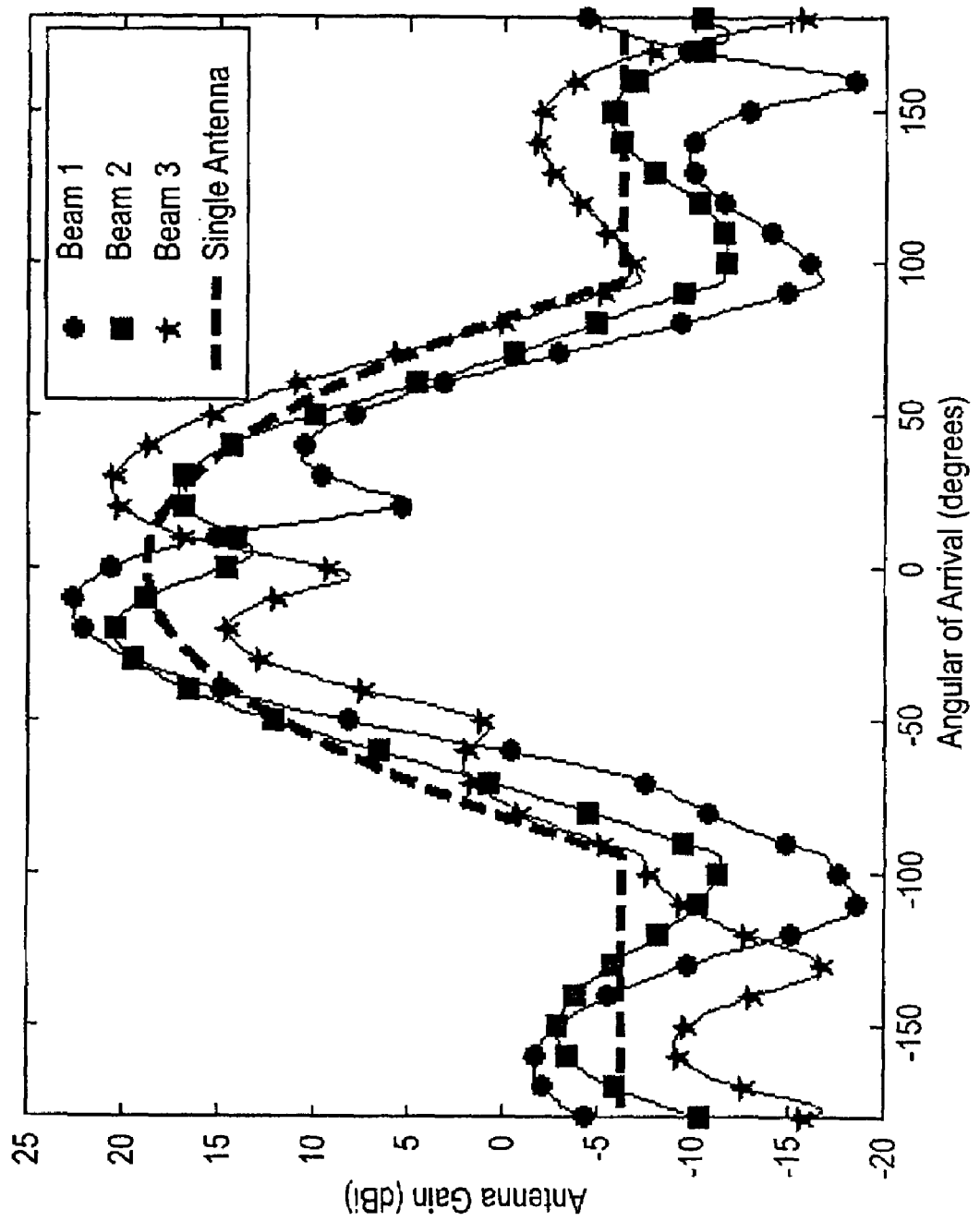

Further, the multiple sets of beams are arranged into one or more groups, with each group comprising one beam from each set, and within each group the beams of that group being orthogonal with respect to each other. The benefit of using orthogonal beams will be described further with reference to the simulated results shown in FIGS. 12 and 13. As shown in FIG. 12, the antenna gain (dashed line) when using a single sectorized antenna system (i.e. producing a single beam for the sector) is shown. The antenna gain is plotted as a function of angular displacement. For example, at zero degrees, a subscriber station will receive a maximum antenna gain of 18 dBi. In the same figure the gain of an antenna array consisting of three antenna elements forming three random (in direction and shape) beams is also shown. The beams are designed to be mutually orthogonal. It should be noted that in any direction there is a beam that yields an antenna gain greater than that of the single sectorized antenna system. The antenna array gain is thus the envelope (the maximum) of the three beams. In FIG. 13, the antenna array gain is shown when the beams do not satisfy the orthogonality principle. The beams are random in direction and shape, but unfortunately cannot always guarantee improved gains relative to a single antenna.

Further, due to the beams of embodiments of the present invention being generated randomly (albeit with the requirement for orthogonality within each group), the techniques of embodiments of the present invention can be used with non-calibrated antenna arrays, thus avoiding the additional complexity and costs associated with systems using calibrated arrays.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A point to multipoint device for use in a wireless network to provide wireless communication with a plurality of telecommunications units, for communication from the point to multipoint device to the telecommunications units, the point to multipoint device being operable to employ multiple sets of beams, at any point in time one set being used, the point to multipoint device comprising:
   beam set generation logic for generating the multiple sets of beams arranged into one or more groups, each group comprising one beam from each set, within each group the beams of that group being orthogonal with respect to each other, and each beam within each set being generated randomly with respect to other beams in that set;
   an interface for receiving a synchronisation signal issued to all point to multipoint devices in the wireless network;
   beam switching logic for determining, having regard to the synchronisation signal, switch times at which the point to multipoint device switches from one set of beams to another set of beams, the switch times being the same for all point to multipoint devices in the wireless network; and
   an antenna array controlled by the beam switching logic for producing at any point in time one of the sets of beams for transmitting data forming the communication to the telecommunications units;
   wherein the beam set generation logic is operable for each group:
   to generate an N×N random matrix, where N is the number of antennae in the antenna array used to generate the beams of that group, and N is equal to or greater than the number of beams in that group;
   to generate from the N×N random matrix an N×N unitary matrix; and
   to select a different column of the N×N unitary matrix to represent each beam in the group, where each entry in the column defines a beam weight to be used by a particular antenna of the antenna array when generating the associated beam.

2. A point to multipoint device as claimed in claim 1, wherein each set comprises multiple beams.

3. A point to multipoint device as claimed in claim 2, wherein the point to multipoint device provides wireless communication within a plurality of sectors, and each group is associated with one of the sectors.

4. A point to multipoint device as claimed in claim 1, further comprising:
   telecommunications unit allocation logic operable, for each telecommunications unit, to allocate that telecommunications unit to at least one of the beams based on a report signal issued to the point to multipoint device from that telecommunications unit.

5. A point to multipoint device as claimed in claim 4, wherein the report signal is issued to the point to multipoint device at the time the telecommunications unit logs on to the wireless network, the report signal acknowledging receipt of one of the beams in the set being produced by the antenna array at that time, and the telecommunications unit allocation logic being responsive to the report signal to allocate the telecommunications unit to at least that beam received by the telecommunications unit.

6. A point to multipoint device as claimed in claim 4, wherein the telecommunications unit allocation logic is arranged at predetermined intervals to issue requests to each telecommunications unit for them to provide one or more report signals, for each telecommunications unit the telecommunications unit allocation logic being responsive to the provided one or more report signals to select at least one beam to allocate that telecommunications unit to.

7. A point to multipoint device as claimed in claim 6, wherein the one or more report signals provide at least a signal quality measurement associated with a beam.

8. A point to multipoint device as claimed in claim 1, wherein the beam set generation logic is operable, on occurrence of one or more predetermined events, to re-perform generation of the multiple sets of beams, thereby facilitating an evening of the quality of service provided to each telecommunications unit over time.

9. A point to multipoint device as claimed in claim 8, wherein the one or more predetermined events comprise at least an elapsing of a predetermined time interval, the predetermined time interval being larger than the period between switch times calculated by the beam switching logic.

10. A point to multipoint device as claimed in claim 1, wherein the point to multipoint device is a base station, the plurality of telecommunications units are a plurality of subscriber stations, and for downlink communication from the base station to the subscriber stations, the base station being operable to employ said multiple sets of beams.

11. A point to multipoint device as claimed in claim 10, wherein each set comprises multiple beams and the base station provides wireless communication within a plurality of sectors, each group being associated with one of the sectors.

12. A point to multipoint device as claimed in claim 1, wherein the point to multipoint device is base station sector logic, the plurality of telecommunications units are a plurality of subscriber stations, and for downlink communication from the base station sector logic to the subscriber stations, the base station sector logic being operable to employ said multiple sets of beams arranged into one group, with each set comprising one beam.

13. A point to multipoint device as claimed in claim 10, wherein the wireless communication is composed of a plurality of frames, with downlink communication taking place during at least a portion of each frame, and the switch times determined by the beam switching logic correspond to the start of each frame.

14. A point to multipoint device as claimed in claim 13, wherein the wireless communication is an IEEE 802.16 communication, with each frame comprising an uplink: sub frame for uplink communication and a downlink sub frame for the downlink communication.

15. A point to multipoint device as claimed in claim 14, wherein the uplink subframe is separated in either time or frequency with respect to the downlink subframe.

16. A wireless network comprising a plurality of point to multipoint devices, each point to multipoint device being arranged to provide wireless communication with an associated plurality of telecommunications units, and each point to multipoint device being a point to multipoint device as claimed in any preceding claim, wherein the multiple sets of beams generated by each point to multipoint device are randomly generated with respect to each other.

17. A method of operating a point to multipoint device used in a wireless network to provide wireless communication with a plurality of telecommunications units, for communication from the point to multipoint device to the telecommunications units, the point to multipoint device employing multiple sets of beams, at any point in time one set being used, the method comprising the steps of:

generating the multiple sets of beams arranged into one or more groups, each group comprising one beam from each set, within each group the beams of that group being orthogonal with respect to each other, and each beam within each set being generated randomly with respect to other beams in that set;

receiving a synchronisation signal issued to all point to multipoint devices in the wireless network;

determining, having regard to the synchronisation signal, switch times at which the point to multipoint device switches from one set of beams to another set of beams, the switch times being the same for all point to multipoint devices in the wireless network; and controlling an antenna array to produce at any point in time one of the sets of beams for transmitting data forming the communication to the telecommunications units;

wherein said step of generating the multiple sets of beams arranged into one or more groups comprises:

generating an N×N random matrix, where N is the number of antennae in the antenna array used to generate the beams of that group, and N is equal to or greater than the number of beams in that group;

generating from the N×N random matrix an N×N unitary matrix; and selecting a different column of the N×N unitary matrix to represent each beam in the group, where each entry in the column defines a beam weight to be used by a particular antenna of the antenna array when generating the associated beam.

* * * * *